(12) United States Patent
Lövenich et al.

(10) Patent No.: US 9,722,249 B2
(45) Date of Patent: Aug. 1, 2017

(54) USE OF CONDUCTIVE POLYMERS IN BATTERY ELECTRODES

(71) Applicants: Heraeus Precious Metals GmbH & Co. KG, Hanau (DE); Ewe-Forschungszentrum Für Energietechnologie E.V., Oldenburg (DE)

(72) Inventors: Wilfried Lövenich, Bergisch Gladbach (DE); Lidiya Komsiyska, Oldenburg (DE); Eva-Maria Hammer, Oldenburg (DE); Daniela Ledwoch, Oldenburg (DE)

(73) Assignees: Heraeus Deutschland GmbH & Co. KG, Hanau (DE); Ewe-Forschungszentrum Für Energietechnologie E.V., Oldenburg (DE)

( * ) Notice: Subject to any disclaimer, the term of this patent is extended or adjusted under 35 U.S.C. 154(b) by 0 days.

(21) Appl. No.: 14/646,905

(22) PCT Filed: Nov. 22, 2013

(86) PCT No.: PCT/EP2013/003533
§ 371 (c)(1),
(2) Date: May 22, 2015

(87) PCT Pub. No.: WO2014/079581
PCT Pub. Date: May 30, 2014

(65) Prior Publication Data
US 2015/0303477 A1    Oct. 22, 2015

Related U.S. Application Data

(60) Provisional application No. 61/733,628, filed on Dec. 5, 2012.

(30) Foreign Application Priority Data

Nov. 26, 2012  (DE) .................. 10 2012 022 976

(51) Int. Cl.
*H01M 4/04*     (2006.01)
*H01M 4/58*     (2010.01)
(Continued)

(52) U.S. Cl.
CPC .......... *H01M 4/608* (2013.01); *H01M 4/049* (2013.01); *H01M 4/136* (2013.01); *H01M 4/137* (2013.01);
(Continued)

(58) Field of Classification Search
CPC ...... H01M 4/049; H01M 4/136; H01M 4/137; H01M 4/1397; H01M 4/1399;
(Continued)

(56) References Cited

U.S. PATENT DOCUMENTS

2013/0157105 A1   6/2013   Picard et al.
2014/0022705 A1   1/2014   Tomioka
(Continued)

FOREIGN PATENT DOCUMENTS

CN        102522563       6/2012
JP        2004-158286     6/2004
(Continued)

OTHER PUBLICATIONS

Dinh, Hung-Cuong et al., Characteristics of conducting polymer-coated nanosized LiFePO4 cathode in the Li+ batteries, ECS Transaction, vol. 28, No. 8, 2010, 167-175.*
(Continued)

*Primary Examiner* — Brittany Raymond
(74) *Attorney, Agent, or Firm* — Servilla Whitney LLC

(57) ABSTRACT

Described are a composition at least comprising complexes of polythiophene and polyanions, at least one lithium-
(Continued)

containing compound, and at least one solvent, wherein the composition comprises less than 1 g of a material comprising elemental carbon, based on 1 g of the polythiophenes, or comprises no material at all comprising elemental carbon, and a process for the preparation of a composition, the composition obtainable by this process, the use of a composition and a cathode in an Li ion accumulator.

19 Claims, 5 Drawing Sheets

(51) Int. Cl.
    H01M 4/60        (2006.01)
    H01M 10/0525     (2010.01)
    H01M 4/136       (2010.01)
    H01M 4/137       (2010.01)
    H01M 4/1397      (2010.01)
    H01M 4/1399      (2010.01)
    H01M 4/62        (2006.01)
    H01M 4/02        (2006.01)

(52) U.S. Cl.
    CPC ....... H01M 4/1397 (2013.01); H01M 4/1399 (2013.01); H01M 4/5825 (2013.01); H01M 4/624 (2013.01); H01M 10/0525 (2013.01); H01M 2004/028 (2013.01)

(58) Field of Classification Search
    CPC .... H01M 4/5825; H01M 4/608; H01M 4/624; H01M 2004/028; H01M 10/0525; Y02P 70/54; Y02E 60/122
    See application file for complete search history.

(56) References Cited

U.S. PATENT DOCUMENTS

2014/0050978 A1    2/2014  Otaka et al.
2014/0315081 A1   10/2014  Zhang et al.

FOREIGN PATENT DOCUMENTS

| JP | 2011-100594    | * | 5/2011 |
| WO | WO-2012/038628 |   | 3/2012 |
| WO | WO-2012/096342 |   | 7/2012 |
| WO | 2012137969 A1  |  | 10/2012 |

OTHER PUBLICATIONS

English translation of JP Publication 2011-100594, May 2011.*
PCT International Preliminary Report on Patentability in PCT/EP2013/003533, dated May 26, 2015, 7 pages.
PCT International Search Report in PCT/EP2013/003533, mailed May 13, 2014, 4 pages.
PCT International Written Opinion in PCT/EP2013/003533, mailed May 13, 2014, 6 pages.
Dinh, Hung-Cuong, et al., Characteristics of Conducting Polymer-Coated Nanosized LiFePO4 Cathode in the LI+ Batteries, *ECS Transactions* vol. 28 No. 8 2010, 167-175.
Chen, et al., "Insight into the improvement of rate capability and cyclability in LiFeP04/polyaniline composite cathode", Electrochimica Acta, 56 (2011), 2689.
Dinh, et al., "Electrochemical Analysis of Conductive Polymer-Coated LiFeP04 Nanocrystalline Cathodes with Controlled Morphology", Electroanalysis 2011, No. 9, 2079.
Elschner, et al., "PEDOT—Principles and Applications of an Intrinsically Conductive Polymer", CRC Press (2011), Chapter 9.1.3.
Fedorkova, et al., "Structural and electrochemical studies of PPy/PEG-LiFePO4 cathode material for Li-ion batteries", Electrochimica Acta 55 (2010), 943.
Guyomard, et al., "Li Metal-Free Rechargeable LiMn2O4/Carbon Cells: Their Understanding and Optimization", J. Electrochem. Soc., vol. 139, No. 4, Apr. 1992, 937.
Mueller, "Automated Determination of Particle-Size Distributions of Dispersions by Analytical Ultracentrifugation", Colloid Polym. Sci. 267, 1989, 1113-1116.

* cited by examiner

USE OF CONDUCTIVE POLYMERS IN BATTERY ELECTRODES

CROSS-REFERENCE TO RELATED APPLICATIONS

This application is the National Stage entry of PCT/EP2013/003533, filed on Nov. 22, 2013, which claims priority to German Application Nos. 10 2012 022 976.3, filed on Nov. 26, 2012, and U.S. Ser. No. 61/733,628 filed on Dec. 5, 2012, which are incorporated herein by reference in their entireties.

FIELD

The present invention relates to a composition at least comprising complexes of polythiophene and polyanions, at least one lithium metal oxide and at least one organic, polar solvent, a process for the preparation of a composition, the composition obtainable by this process, the use of a composition and a cathode in a lithium ion accumulator.

BACKGROUND

Li ion accumulators are distinguished by a high energy density and are heat-stable. The terms accumulator and battery are used as equivalent in the following. Graphite or lithium titanate is usually used as the negative electrode (anode). Lithium-containing compounds, in particular lithium metal oxides or lithium phosphates, are used as the positive electrode (cathode). The following materials in particular are known as the active electrode material: $LiCoO_2$, $LiNiO_2$, $LiNi_{1-x}Co_xO_2$, $LiNi_{0.85}Co_{0.1}Al_{0.05}O_2$, $LiNi_{0.33}Co_{0.33}Mn_{0.33}O_2$, $LiMn_2O_4$, $LiFePO_4$, $Li_3V_2(PO_4)_3$, $LiMnPO_4$ and $LiV_3O_8$.

Li ion accumulators are classified further according to the electrode materials employed into lithium cobalt dioxide accumulators ($LiCoO_2$), lithium-manganese accumulators, lithium iron phosphate accumulators ($LiFePO_4$) and tin-sulphur-lithium ion accumulators. Lithium iron phosphate is a widely used cathode material since it is distinguished by a high structural stability, low toxicity and relatively low costs (see Dinh in Electroanalysis 2011, 23, no. 9, page 2079). $LiFePO_4$ has a moderate theoretical capacitance of 170 mAh/g and a stable voltage plateau of 3.45 V versus $Li/Li^+$. Nevertheless, pure $LiFePO_4$, like other lithium metal oxides also, is distinguished by a low electrical conductivity ($10^{-9}$ S/cm for $LiFePO_4$) and low ionic conductivity. This disadvantage can be compensated by the use of composite materials which, in addition to the lithium metal oxide, contain a material having a high conductivity. Carbon black, graphite and conductive polymers are known as the conductivity composite material.

The methods known to date for employing conductive polymers as the conductivity composite material are involved processes, since either the conductive polymers are polymerized on the cathodes, or combinations with further composite materials, such as, for example, carbon black or carbon fibres, are necessary.

For example, composite materials in which polypyrrole has been deposited on $LiFePO_4$ are known. The use of this material as the cathode in an Li ion accumulator leads to an increased current capability (see Fedorkova et al. in Electrochim. Acta 55, 2010, page 943). $LiFePO_4$/polyaniline cathodes in turn are distinguished by an increased cycle stability (see Chen et al. in Electrochim. Acta, 56, 2011, page 2,689). It is furthermore known that $LiFePO_4$/PEDOT composite materials improve the current capability and cycle stability (see Dinh et al. in ECS Transactions 28, 2010, page 167).

In JP 2004-158286 composite materials of $MoO_3$ and PEDOT are prepared and tested as an electrode, the PEDOT first being deposited as a precipitate and then being mixed with the $MoO_3$. (PEDOT)/$LiCoO_2$/carbon fibre composite materials which achieve an improved cycle stability and electrochemical stability compared with cathodes without a conductive polymer are furthermore known.

JP 2011-100594 describes the use of complexes of PEDOT and a sulphonated polymer in the presence of a carbon-based conductivity additive based on carbon-containing substances, such as, for example, carbon black, for use in Li ion accumulators. For this the conductive monomer can be polymerized by chemical or electrochemical means. It is then precipitated and redissolved.

SUMMARY

A first aspect of the invention pertains to a composition, at least comprising
a) complexes of polythiophene and polyanions,
b) at least one lithium-containing compound, and
c) at least one solvent,
wherein the composition comprises less than 1 g of a material comprising elemental carbon, based on 1 g of the polythiophenes, or comprises no material at all comprising elemental carbon.

A second aspect of the invention pertains to a composition, wherein the complexes a) are complexes of poly(3,4-ethylenedioxythiophene) and polystyrenesulphonic acid (PEDOT/PSS).

A third aspect of the invention pertains to a composition, wherein the at least one lithium-containing compound is chosen from the group consisting of $LiCoO_2$, $LiNiO_2$, $LiNi_{1-x}Co_xO_2$, $LiNi_{0.85}Co_{0.1}Al_{0.05}O_2$, $LiNi_{0.33}Mn_{0.33}O_2$, $LiMn_2O_4$, $LiFePO_4$, $Li_3V_2(PO_4)_3$, $LiMnPO_4$, $LiV_3O_8$ or mixtures of at least two of these.

A fourth aspect of the invention pertains to a composition, wherein the at least one lithium-containing compound is $LiFePO_4$.

A fifth aspect of the invention pertains to a composition, wherein the at least one lithium-containing compound is present in the form of particles having a weight average particle size in a range of from 0.02 to 100 μm.

A sixth aspect of the invention pertains to a composition, wherein the at least one solvent is an organic, protic solvent.

A seventh aspect of the invention pertains to a composition, wherein the at least one solvent is chosen from the group consisting of water, alcohols, ketones, nitriles, sulphoxides, sulphones, carboxylic acid amides, pyrrolidones, carbonates and mixtures of at least two of these.

An eighth aspect of the invention pertains to a composition, wherein the at least one solvent is N-methylpyrrolidone.

A ninth aspect of the invention pertains to a composition, wherein the solids content of the composition is in a range of from 0.01 to 60 wt. %.

A tenth aspect of the invention pertains to a composition, wherein the weight ratio of component b) to component a) in the composition is in a range of from 1:1 to 200:1.

An eleventh aspect of the invention pertains to a composition, wherein the composition comprises a water content, determined by Karl-Fischer titration, of at most 10 wt. %, based on the total weight of the composition.

Another aspect of the invention relates to a process for the preparation of a composition, comprising the process steps:
I) provision of a composition comprising complexes of the polythiophene and the polyanion;
II) mixing of the composition comprising complexes of the polythiophene and the polyanion with at least one lithium-containing compound;
wherein in the process less than 1 g of a material comprising elemental carbon, based on 1 g of the polythiophenes, is employed in the preparation of the composition, or wherein no material at all comprising elemental carbon is employed.

A twelfth aspect of the invention pertains to a process, comprising the process steps
Ia) oxidative polymerization of thiophene monomers in the presence of polyanions in an aqueous phase at an oxygen concentration of less than 3 mg/l, obtaining an aqueous composition comprising complexes of the polythiophene and the polyanion;
Ib) at least partial removal, by means of an ion exchanger, of salts from the aqueous composition obtained in process step Ia);
Ic) addition of at least one polar, organic solvent to the desalinated aqueous composition obtained in process step Ib);
Id) at least partial removal of the water from the desalinated aqueous composition obtained in process step Ic), obtaining an organic composition comprising the complexes of polythiophene and polyanions and the at least one organic, polar solvent;
II) mixing of the organic composition obtained in process step Id) comprising the complexes of polythiophene and polyanions and the organic, polar solvent with at least one lithium metal oxide.

A thirteenth aspect of the invention pertains to a process, wherein the oxidative polymerization of the thiophene monomers in process step Ia) is carried out under a pressure of less than 500 mbar.

A fourteenth aspect of the invention pertains to a process, wherein a dried layer of the composition obtained in process step Ib) to which 5 wt. % of DMSO has been added has a conductivity of at least 50 S/cm.

A fifteenth aspect of the invention pertains to a process, wherein a dried layer of the aqueous composition obtained in process step Ib) to which 5 wt. % of DMSO has been added has a conductivity of at least 100 S/cm.

A sixteenth aspect of the invention pertains to a process, wherein in process step Id) the water is removed to such an extent that subsequently to process step II) a composition having a water content, determined by Karl-Fischer titration, of at most 10 wt. %, based on the total weight of the composition, is obtained.

Another aspect of the present invention relates to a composition obtainable by a process described herein.

Another aspect of the present invention relates to a use of a composition as described herein for the production of a cathode in an Li ion accumulator.

Another aspect of the present invention relates to a cathode in an Li ion accumulator, obtainable by the application of a composition as described herein to a substrate, and the at least partial removal of the at least one organic solvent.

DETAILED DESCRIPTION

Figure 1:
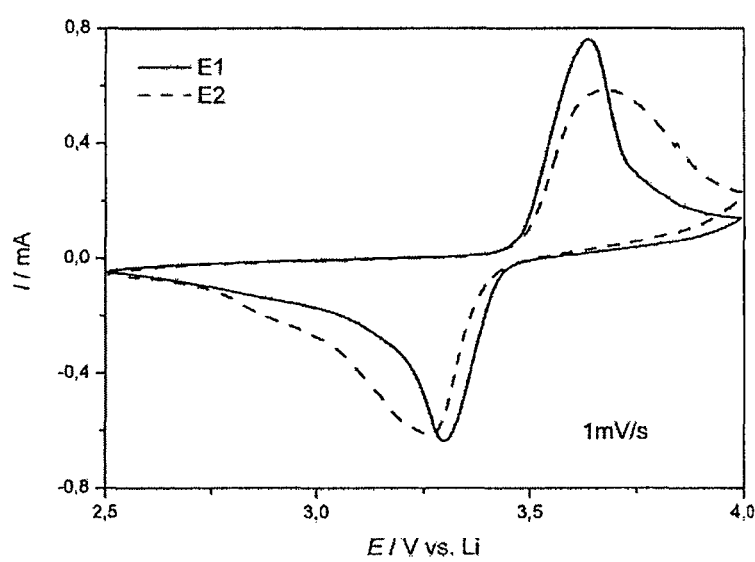
FIG. 1 shows a cyclovoltagram of a cathode according to the invention.

The present invention was based on the object of overcoming the disadvantages emerging from the prior art in connection with cathode materials for Li ion accumulators.

In particular, the present invention was based on the object of providing a composition from which electrodes in Li ion accumulators can be produced, wherein this composition can be processed easily and leads to a Li ion accumulator having a high voltage efficiency, high cycle stability and low degree of ageing.

The present invention was also based on the object of providing a process by means of which the advantageous composition described above can be prepared as simply and inexpensively as possible.

A contribution towards achieving these objects is made by a composition at least comprising
a) complexes of polythiophene and polyanions,
b) at least one lithium-containing compound, and
c) at least one solvent,
wherein the composition comprises less than 1 g, particularly preferably less than 0.1 g, still more preferably less than 0.01 g and most preferably less than 0.001 g of a material comprising elemental carbon, in each case based on 1 g of the polythiophenes, or comprises no material at all comprising elemental carbon, compositions which comprise no material at all comprising elemental carbon being most preferred.

A "material comprising elemental carbon" is preferably understood as meaning materials which have a carbon content of at least 80 wt. %, particularly preferably of at least 85 wt. % and still more preferably of at least 90 wt. %. These include, in particular, compounds such as graphite, carbon black, active charcoal or mixtures of these, and indeed regardless of the form in which these materials are present (powder, granules, platelets, fibres, tubes etc.).

The composition according to the invention, which is preferably a dispersion, comprises as component a) complexes of polythiophene and polyanions.

In this connection, it is particularly preferable for the polythiophene to be a polythiophene having recurring units of the general formula (i) or (ii) or a combination of units of the general formulae (i) and (ii), very particularly preferably a polythiophene having recurring units of the general formula (ii)

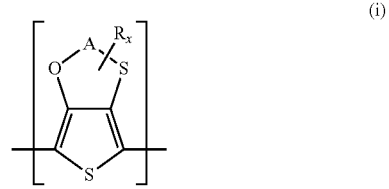

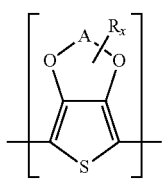

wherein

A represents an optionally substituted $C_1$-$C_5$-alkylene radical,

R represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical, x represents an integer from 0 to 8 and in the case where several radicals R are bonded to A, these can be identical or different.

The general formulae (i) and (ii) are to be understood as meaning that x substituents R can be bonded to the alkylene radical A.

Polythiophenes having recurring units of the general formula (ii) wherein A represents an optionally substituted $C_2$-$C_3$-alkylene radical and x represents 0 or 1 are particularly preferred.

In the context of the invention, the prefix "poly" is to be understood as meaning that the polymer or polythiophene comprises more than one identical or different recurring units of the general formulae (i) and (ii). In addition to the recurring units of the general formulae (i) and/or (ii), the polythiophenes can optionally also comprise other recurring units, but it is preferable for at least 50%, particularly preferably at least 75% and most preferably at least 95% of all the recurring units of the polythiophene to have the general formula (i) and/or (ii), preferably the general formula (ii). The percentage figures stated above are intended here to express the numerical content of the units of the structural formula (i) and (ii) in the total number of monomer units in the foreign-doped conductive polymer. The polythiophenes comprise a total of n recurring units of the general formula (i) and/or (ii), preferably of the general formula (ii), wherein n is an integer from 2 to 2,000, preferably 2 to 100. The recurring units of the general formula (i) and/or (ii), preferably of the general formula (ii), can in each case be identical or different within a polythiophene. Polythiophenes having in each case identical recurring units of the general formula (ii) are preferred.

According to a very particular embodiment of the composition according to the invention, at least 50%, particularly preferably at least 75%, still more preferably at least 95% and most preferably 100% of all the recurring units of the polythiophene are 3,4-ethylenedioxythiophene units (i.e. the most preferred polythiophene is poly(3,4-ethylenedioxythiophene)).

The polythiophenes preferably in each case carry H on the end groups.

In the context of the invention $C_1$-$C_5$-alkylene radicals A are preferably methylene, ethylene, n-propylene, n-butylene or n-pentylene. $C_1$-$C_{18}$-Alkyl radicals R preferably represent linear or branched $C_1$-$C_{18}$-alkyl radicals, such as methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl radicals R represent, for example, cyclopentyl, cyclohexyl, cycloheptyl, cyclooctyl, cyclononyl or cyclodecyl, $C_5$-$C_{14}$-aryl radicals R represent, for example, phenyl or naphthyl, and $C_7$-$C_{18}$-aralkyl radicals R represent, for example, benzyl, o-, m-, p-Tolyl, 2,3-, 2,4-, 2,5-, 2,6-, 3,4-, 3,5-xylyl or mesityl. The preceding list serves to illustrate the invention by way of example and is not to be considered conclusive.

In the context of the invention numerous organic groups are possible as optional further substituents of the radicals A and/or of the radicals R, for example alkyl, cycloalkyl, aryl, aralkyl, alkoxy, halogen, ether, thioether, disulphide, sulphoxide, sulphone, sulphonate, amino, aldehyde, keto, carboxylic acid ester, carboxylic acid, carbonate, carboxylate, cyano, alkylsilane and alkoxysilane groups and carboxamide groups.

The polythiophenes are preferably cationic, "cationic" relating only to the charges on the polythiophene main chain. The positive charges are not shown in the formulae, since their precise number and position cannot be determined absolutely. However, the number of positive charges is at least 1 and at most n, where n is the total number of all recurring units (identical or different) within the polythiophene.

To compensate the positive charge, the complexes a) comprise polyanions as counter-ions, it being preferable according to the invention for polyanions having $SO_3^-M^+$ groups to serve as counter-ions to the polythiophenes ($M^+$=$H^+$, $Na^+$, $K^+$, $Li^+$ or $NH_4^+$). Polyanions having $SO_3^-M^+$ groups are preferably polymeric sulphonic acids, such as polystyrenesulphonic acid or polyvinylsulphonic acid. These polysulphonic acids can also be copolymers of vinylcarboxylic and vinylsulphonic acids with other polymerizable monomers, such as acrylic acid esters and styrene. The anion of polystyrenesulphonic acid (PSS) is particularly preferred as the polyanion having $SO_3^-M^+$ groups. The molecular weight of the polyanions is preferably 1,000 to 2,000,000, particularly preferably 2,000 to 500,000. The polyanions having $SO_3^-M^+$ groups or their alkali metal salts are commercially obtainable or can be prepared by known processes (see e.g. Houben Weyl, Methoden der organischen Chemie, vol. E 20 Makromolekulare Stoffe, part 2, (1987), p. 1141 et seq.).

According to a particularly preferred embodiment of the composition according to the invention, the complexes a) are complexes of poly(3,4-ethylenedioxythiophene) and polystyrenesulphonic acid (PEDOT/PSS complexes). Such complexes are in principle obtainable by polymerizing 3,4-ethylenedioxythiophene oxidatively in aqueous solution in the presence of polystyrenesulphonic acid. Details of this are to be found, for example, in chapter 9.1.3 in "PEDOT•Principles and Applications of an Intrinsically Conductive Polymer", Elschner et al., CRC Press (2011).

The complexes a) of polythiophenes and polyanions, in particular the PEDOT/PSS complexes, are preferably present in the composition according to the invention in the form of particles. These particles preferably have a diameter $d_{50}$ in a range of from 1 to 500 nm and particularly preferably in a range of from 10 to 250 nm. The $d_{50}$ value of the diameter distribution says in this context that 50% of the total weight of all the particles in the composition can be assigned to those particles which have a diameter of less than or equal to the $d_{50}$ value. The diameter of the particles is determined via an ultracentrifuge measurement. The general procedure is described in Colloid Polym. Sci. 267, 1113-1116 (1989).

It is furthermore preferable according to the invention for a dried layer obtained from an aqueous dispersion comprising the complexes a) of polythiophenes and polyanions, in particular the PEDOT/PSS complexes, and 5 wt. % of DMSO to have a conductivity of at least 50 S/cm, still more preferably of at least 100 S/cm, still more preferably of at least 250 S/cm and still more preferably of at least 700 S/cm. Such highly conductive complexes are obtainable, for example, by carrying out the polymerization of the thiophene monomers under an inert gas atmosphere and, if appropriate, under reduced pressure (in vacuo). In this context an "inert gas atmosphere" is preferably understood as meaning an oxygen content of less than 3 mg/1, still more preferably of less than 0.5 mg/1 and still more preferably of less than 0.1 mg/1 in the aqueous reaction solution comprising the thiophene monomers and the polyanion.

In addition to the complexes a) described above of polythiophenes and polyanions, the composition according to the invention furthermore comprises as component b) at least one lithium-containing compound, which is preferably a lithium metal oxide or lithium phosphate. Preferred lithium-containing compounds b) are chosen from the group consisting of $LiCoO_2$, $LiNiO_2$, $LiNi_{1-x}Co_xO_2$, $LiNi_{0.85}Co_{0.1}Al_{0.05}O_2$, $LiNi_{0.33}Mn_{0.33}O_2$, $LiMn_2O_4$, $LiFePO_4$, $Li_3V_2(PO_4)_3$, $LiMnPO_4$, $LiV_3O_8$ or mixtures of at least two of these. The use of $LiFePO_4$ as the lithium-containing compound is very particularly preferred according to the invention. In this connection it is furthermore preferable for the lithium-containing compound b) to be present in the form of particles having a weight-average particle size in a range of from 0.02 to 100 μm, particularly preferably in a range of from 0.05 to 10 μm, the lithium-containing compound preferably having a theoretical capacitance in a range of from 100 to 500 mAh/g, particularly preferably in a range of from 100 to 180 mAh/g.

In addition to the complexes a) described above of polythiophenes and polyanions and the at least one lithium-containing compound b), the composition according to the invention furthermore also comprises as component c) at least one solvent, which can be, for example, an organic, polar solvent. Preferably, the solvent is chosen from the group consisting of water, alcohols, such as, for example, methanol, ethanol, 1-propanol, 2-propanol, n-butanol, isobutanol or tert-butanol, ketones, such as, for example, acetone or methyl ethyl ketone, nitriles, sulphoxides, sulphones, carboxylic acid amides, pyrrolidones, carbonates and mixtures of at least two of these. The use of N-methylpyrrolidone as the solvent is very particularly preferred according to the invention.

In addition to components a) to c) described above, the composition according to the invention can also comprise further additives d) which differ from components a) to c). Possible additives d) are surface-active substances, e.g. anionic surfactants, such as e.g. alkylbenzenesulphonic acids and salts, paraffinsulphonates, alcohol sulphonates, ether sulphonates, sulphosuccinates, phosphate esters, alkyl ether carboxylic acids or carboxylates, cationic surfactants, such as e.g. quaternary alkylammonium salts, nonionic surfactants, such as e.g. linear alcohol ethoxylates, oxo alcohol ethoxylates, alkylphenol ethoxylates or alkyl polyglucosides, adhesion promoters, such as e.g. organofunctional silanes or hydrolysates thereof, e.g. 3-glycidoxypropyltrialkoxysilane, 3-aminopropyl-triethoxysilane, 3-mercaptopropyltrimethoxysilane, 3-methacryloxypropyl-trimethoxysilane, vinyltrimethoxysilane or octyltriethoxysilane, or crosslinking agents, such as melamine compounds, masked isocyanates, functional silanes—e.g. tetraethoxysilane, alkoxysilane hydrolysates, e.g. based on tetraethoxysilane, epoxysilanes, such as 3-glycidoxypropyltrialkoxysilane, epoxides or oxetanes, binders, such as, for example, polyalkylene glycols, polyacrylates, polyurethanes, polyesters, polyethers, polyamides, polyvinyl alcohol, polytetrafluoroethylene or polyvinylidene fluoride, additives which increase the conductivity, such as, for example, polyalkylene glycols, in particular polyethylene glycols or polypropylene glycols, polyglycerols or mixtures of these, polyols, such as propylene glycol and ethylene glycol, sulphoxides, such as dimethylsulphoxide, carboxylic acid amides, such as methylacetamide, dimethylacetamide, dimethylformamide, N-methylpyrrolidone, N-cyclohexylpyrrolidone, ionic liquids, sugars, such as sorbitol.

According to a preferred embodiment of the composition according to the invention, the solids content of the composition is in a range of from 0.01 to 60 wt. %, particularly preferably in a range of from 0.1 to 30 wt. % and most preferably in a range of from 1 to 20 wt. %.

It is furthermore preferable according to the invention for the weight ratio of component b) to component a) in the composition to be in a range of from 1:1 to 200:1, particularly preferably in a range of from 2:1 to 50:1 and most preferably in a range of from 7.5:1 to 15:1.

It is furthermore preferable for the composition according to the invention to comprise a water content, determined by Karl-Fischer titration, of at most 10 wt. %, particularly preferably of at most 7.5 wt. % and most preferably of at most 5 wt. %, in each case based on the total weight of the composition.

The composition according to the invention is obtainable, for example, by a process comprising the process steps:

I) provision of a composition comprising complexes of the polythiophene and the polyanion;

II) mixing of the composition comprising complexes of the polythiophene and the polyanion with at least one lithium-containing compound;

wherein in the process less than 1 g, particularly preferably less than 0.1 g, still more preferably less than 0.01 g and most preferably less than 0.001 g of a material comprising elemental carbon, based on 1 g of the polythiophenes, is employed in the preparation of the composition, or wherein no material at all comprising elemental carbon is employed.

According to a particular embodiment of the process according to the invention, this comprises the process steps (with part steps Ia) to Id) as process step I) of the process according to the invention):

Ia) oxidative polymerization of thiophene monomers in the presence of polyanions in an aqueous phase at an oxygen concentration of less than 3 mg/1, still more preferably of less than 0.5 mg/1 and still more preferably of less than 0.1 mg/1, obtaining an aqueous composition comprising complexes of the polythiophene and the polyanion;

Ib) at least partial removal, by means of an ion exchanger, of salts from the aqueous composition obtained in process step Ia);

Ic) addition of at least one polar, organic solvent to the desalinated aqueous composition obtained in process step Ib);

Id) at least partial removal of the water from the desalinated aqueous composition obtained in process step Ic), obtaining an organic composition comprising the complexes of polythiophene and polyanions and the at least one organic, polar solvent;

II) mixing of the organic composition obtained in process step Id) comprising the complexes of polythiophene and polyanions and the organic, polar solvent with at least one lithium metal oxide.

In process step Ia) the thiophene monomers are first polymerized oxidatively in the presence of the polyanions in an aqueous phase at an oxygen concentration of less than 3 mg/l, particularly preferably of less than 0.5 mg/l and most preferably of less than 0.1 mg/l, obtaining an aqueous composition comprising complexes of the polythiophene and the polyanion. The polymerization of the thiophene monomers (in the case of poly(3,4-ethylenedioxythiophene) as the polythiophene the polymerization of 3,4-ethylenedioxythiophene) is carried out with suitable oxidizing agents in an aqueous phase. Examples of suitable oxidizing agents are iron(III) salts, in particular $FeCl_3$ and iron(III) salts of aromatic and aliphatic sulphonic acids, $H_2O_2$, $K_2Cr_2O_7$, $K_2S_2O_8$, $Na_2S_2O_8$, $KMnO_4$, alkali metal perborates and alkali metal or ammonium persulphates or mixtures of these oxidizing agents. Further suitable oxidizing agents are disclosed, for example, in chapter 9 in "PEDOT•Principles and Applications of an Intrinsically Conductive Polymer", Elschner et al., CRC Press (2011). Particularly preferred oxidizing agents are $FeCl_3$, $Na_2S_2O_8$ and $K_2S_2O_8$ or mixtures of these. The polymerization is preferably carried out at a reaction temperature of from −20 to 100° C. Reaction temperatures of from 5 to 50° C. are particularly preferred.

It is particularly preferable according to the invention for the oxidizing agent only to be added to the thiophene monomer dissolved or dispersed in the solvent when the oxygen content in the reaction medium has been lowered to the limit values stated above with the aid of the inert gas. Argon, helium or nitrogen, for example, are suitable as the inert gas.

If appropriate, the polymerization can be carried out under reduced pressure (in vacuo), it being particularly preferable for the oxidative polymerization of the thiophene monomers in process step I) to be carried out under a pressure of less than 500 mbar.

By the process measures described above (inert gas atmosphere and polymerization under reduced pressure), dispersions comprising complexes a) of polythiophene and polyanions which are characterized by a particularly high conductivity can be prepared.

In process step Ib), salts are at least partially removed, by means of an ion exchanger, from the aqueous composition obtained in process step Ia). The ion exchanger or exchangers can be stirred, for example, with the composition obtained in process step Ia), or the composition obtained in process step Ia) is conveyed over one or more column/columns packed with ion exchanger. It is particularly preferable for the composition obtained in process step Ia) to be treated both with an anion exchanger and with a cation exchanger. The ion exchangers of Lanxess AG obtained under the trade name LEWATIT® may be mentioned as an example of suitable cation and anion exchangers. A layer of the composition obtained in process step II) preferably has a conductivity of at least 50 S/cm, still more preferably of at least 100 S/cm, still more preferably of at least 250 S/cm and still more preferably of at least 700 S/cm.

In process step Ic), for the purpose of exchanging the solvent, at least one polar, organic solvent is added to the desalinated aqueous composition obtained in process step Ib), the organic, polar solvents preferably being chosen from the group consisting of alcohols, ketones, nitriles, sulphoxides, sulphones, carboxylic acid amides, pyrrolidones, carbonates and mixtures of at least two of these. The use of N-methylpyrrolidone as the organic, polar solvent is very particularly preferred according to the invention. In this context it is particularly preferable for the organic polar solvent to be added in an amount in a range of from 10 to 1,000 ml, particularly preferably in an amount in a range of from 50 to 200 ml per 100 ml of the desalinated aqueous composition obtained in process step Ib).

In process step Id) the water is then at least partially removed from the desalinated aqueous composition obtained in process step Ic), obtaining an organic composition comprising the complexes of polythiophene and polyanions and the at least one organic, polar solvent, this removal preferably being carried out by distillation. A distillation at a temperature in a range of from 25 to 100° C., particularly preferably in a range of from 50 to 75° C., under a pressure in a range of from 10 to 500 mbar, particularly preferably in a range of from 50 to 250 mbar is particularly preferred in this connection. In this context it is preferable to remove the water in process step Id) to such an extent that subsequent to process step II) a composition having a water content, determined by Karl-Fischer titration, of at most 10 wt. %, particularly preferably of at most 7.5 wt. % and most preferably of at most 5 wt. %, in each case based on the total weight of the composition, is obtained.

In process step II) the organic composition obtained in process step Id) comprising the complexes of polythiophene and polyanions and the at least one organic, polar solvent is mixed with the at least one lithium-containing compound.

A contribution towards achieving the abovementioned objects is also made by a process for the preparation of a composition comprising the process steps:

I) provision of a composition comprising complexes of the polythiophene and the polyanion;

II) mixing of the composition comprising complexes of the polythiophene and the polyanion with at least one lithium-containing compound;

wherein in the process less than 1 g, particularly preferably less than 0.1 g, still more preferably less than 0.01 g and most preferably less than 0.001 g of a material comprising elemental carbon, based on 1 g of the polythiophenes, is employed in the preparation of the composition, or wherein no material at all comprising elemental carbon is employed.

With respect to the preferred embodiments of this process, reference is made to the above statements.

A contribution towards achieving the abovementioned objects is also made by a composition which is obtainable by the process according to the invention.

A contribution towards achieving the abovementioned objects is also made by the use of a composition according to the invention or of a composition obtainable by the process according to the invention for the production of a cathode in an Li ion accumulator. An Li ion accumulator conventionally comprises a negative electrode, preferably based on graphite, nanocrystalline, amorphous silicon, $Li_4Ti_5O_{12}$ (lithium titanate accumulator) or $SnO_2$, and a positive electrode, produced from a composition according to the invention or a composition obtainable by the process according to the invention, this composition being applied to an appropriate substrate, preferably to an aluminium foil, and the at least one polar, organic solvent then being at least partially removed, obtaining a conductive electrode layer. The Li ion accumulator furthermore comprises an electrolyte, which conventionally comprises lithium salts, such as LiPF$_6$, LiClO$_4$ or lithium bis(oxalato)borate (LiBOB), dissolved in aprotic solvents, such as ethylene carbonate, propylene carbonate, dimethyl carbonate, diethyl carbonate or 1,2-dimethoxyethane. Instead of these liquid electrolytes, the Li ion accumulator can also comprise an electrolyte which is based on a polymer and is present in the form of a solid to gelatinous film. In this context the anode and cathode in the Li ion accumulator can in each case be spaced by the separator, wound up, or stacked on one another.

A contribution towards achieving the abovementioned objects is also made by a cathode in an Li ion accumulator, obtainable by or obtained by the application of a composition according to the invention or of a composition obtainable by the process according to the invention to a substrate, preferably to an aluminium foil, and the at least partial removal of the at least one organic solvent.

According to a preferred embodiment of the cathode according to the invention, this is obtainable or has been obtained by the application of a composition according to the invention or of a composition obtainable by the process according to the invention, wherein a dried layer of an aqueous dispersion comprising the complexes of the polythiophenes and the polyanions, and 5 wt. % of DMSO has a conductivity of at least 50 S/cm, still more preferably of at least 100 S/cm, still more preferably of at least 250 S/cm and still more preferably of at least 700 S/cm.

The invention is now explained in more detail with the aid of test methods, a non-limiting figure and examples.

FIG. 1 shows a cyclovoltagram of a cathode according to the invention (approx. 35 μm) in an electrolyte of 1 M LiPF$_6$+EMC:EC (1:1) (1 mV×s$^{-1}$) compared with a cathode known from the state of the art (continuous line: electrode from Example 1; broken line: electrode from Comparative Example 1).

Figure 2:
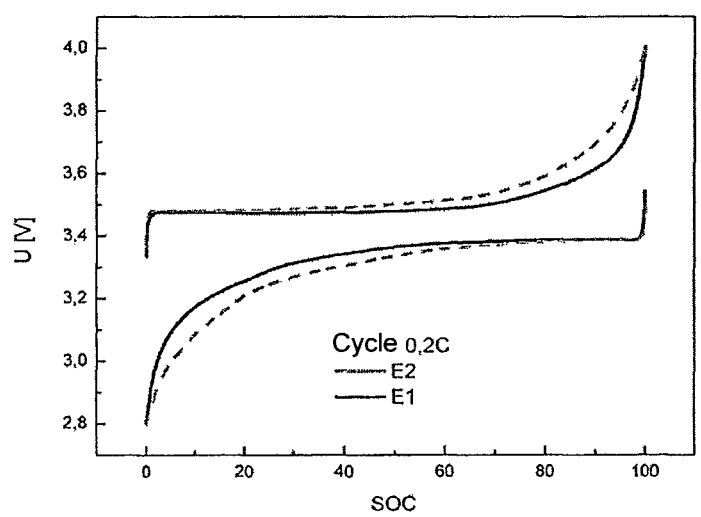
FIG. 2 shows the charge-discharge properties at 0.2 C of a cathode according to the invention.

FIG. 2 shows the charge-discharge properties at 0.2 C of a cathode according to the invention (approx. 35 μm) in an electrolyte of 1 M LiPF$_6$+EMC:EC (1:1) compared with a cathode known from the state of the art (continuous line: electrode from Example 1; broken line: electrode from Comparative Example 1).

Figure 3:
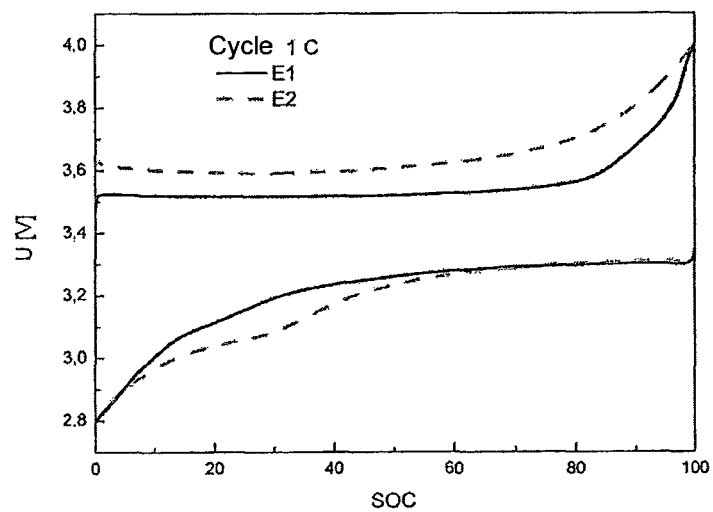
FIG. 3 shows the charge-discharge properties at 1 C of a cathode according to the invention.

FIG. 3 shows the charge-discharge properties at 1 C of a cathode according to the invention (approx. 35 μm) in an electrolyte of 1 M LiPF$_6$+EMC:EC (1:1) compared with a cathode known from the state of the art (continuous line: electrode from Example 1; broken line: electrode from Comparative Example 1).

Figure 4:
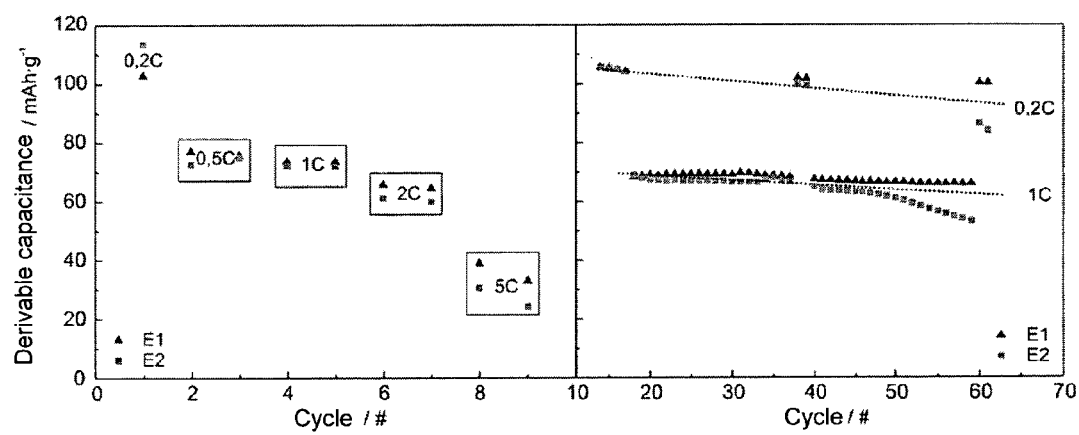
FIG. 4 shows the derivable capacitance of the electrode from Example 1 (triangles) and of the electrode from Comparative Example 1 (squares)

FIG. 4 shows the derivable capacitance of the electrode from Example 1 (triangles) and of the electrode from Comparative Example 1 (squares). Cycling was carried out with variation of the C rate.

Figure 5:
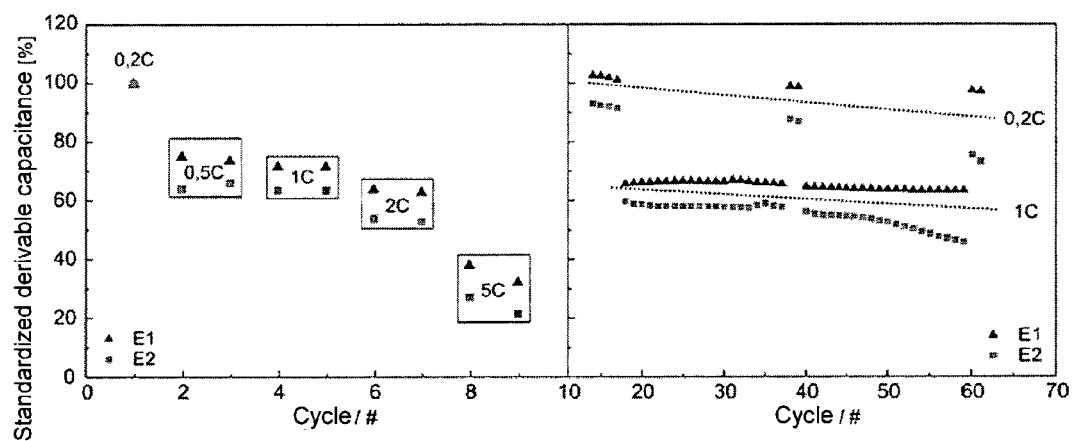
FIG. 5 shows the standardized derivable gravimetric capacitance of the electrode from Example 1 (triangles) and of the electrode from Comparative Example 1 (squares).

FIG. 5 shows the standardized derivable gravimetric capacitance of the electrode from Example 1 (triangles) and of the electrode from Comparative Example 1 (squares). The available capacitance was standardized to that of the initial cycle.

Measurement Methods
Determination of the Conductivity

A cleaned glass substrate was laid on a lacquer whirler coater and 10 ml of the dispersion comprising PEDOT/PSS were distributed on the substrate. The excess solution was then spun off by rotating the plate. Thereafter, the substrate coated in this way was dried on a hot-plate at 130° C. for 15 min. The layer thickness was determined with the aid of a layer thickness meter (Tencor, AlphaStep 500). The conductivity was determined by vapour deposition of Ag electrodes of 2.5 cm length at a distance of 10 mm via a shadow mask.

The surface resistance determined with an electrometer (Keithly 614) was multiplied by the layer thickness in order to obtain the specific electrical resistance. The conductivity corresponds to the reciprocal of the specific electrical resistance.

Determination of the Solids Content 5 g of the dispersion are weighed into a weighing glass with a lid. The dispersion is dried overnight at a given temperature for 14 h in a circulating air drying cabinet. The weighing glass is removed from the drying cabinet, closed with the lid and, after 5 min, the weight is determined.

EXAMPLES

Preparation Example 1: Preparation of a PEDOT/PSS Dispersion of High Conductivity A 3 l high-grade steel tank was equipped with a stirrer, a ventilating valve on the upper lid, a closable material inlet on the upper lid, a ventilating valve on the base and a temperature control jacket connected to a thermostat. 2,050 g of water, 500 g of polystyrenesulphonic acid solution (5.0% strength, Mw=500,000 g/mol, Agfa Gevaert) and 5.6 g of a 10% strength iron(III) sulphate solution (Sigma-Aldrich, Schnelldorf) were introduced into the reaction vessel. The stirrer rotated at 50 rpm. The temperature was set at 18° C. 200 l/h of nitrogen were let in via the ventilating valve on the base, and was able to escape via the opened material inlet. After 3 h the stream of nitrogen at the lower ventilating valve was stopped and a stream of nitrogen of 500 l/h was established at the upper ventilating valve. The stream of nitrogen was able to escape via the material inlet. The residual oxygen content in the reaction medium was less than 0.02 mg/l. 10.13 g of 3,4-ethylenedioxythiophene (Clevios M V2, Heraeus, Leverkusen) were then introduced through the material inlet in countercurrent to the nitrogen with the aid of a syringe.

23.7 g of sodium peroxodisulphate (Sigma-Aldrich, Schnelldorf) were then added via the material inlet in countercurrent to the nitrogen. The temperature was lowered to 4° C. The reaction was now carried out for 23 h.

After the reaction had ended, the reaction vessel was ventilated and the mixture was transferred into a beaker of plastic, and for removal of inorganic salts 500 ml of a cation exchanger (Lewatit S100 H, Lanxess AG) and 290 ml of an anion exchanger (Lewatit MP 62, Lanxess AG) were added. The mixture was stirred for 6 h and the Lewatit was filtered off. Finally, the mixture passed over a 10 μm filter.

Solids content: 1.2% [drying at 100° C.]
Viscosity: 370 mPas
Determination of the Conductivity 1 g of dimethylsulphoxide was added to 19 g of the above dispersion and, as described in the "Measurement methods" paragraph, layers were applied to a glass substrate and the conductivity was measured. The specific resistance of the layer was 0.00286 Ohm×cm. This corresponds to a conductivity of 350 S/cm.

Preparation Example 2: Preparation of a Dispersion in N-Methylpyrrolidone 50 g of the dispersion prepared in Example 1 are mixed with 50 g of N-methylpyrrolidone (NMP; Sigma-Aldrich, Schnelldorf). 48 g of water are removed on a rotary evaporator at 65° C. under a pressure of 100 mbar. The product is filtered over a 5 μm syringe filter.

Solids content: 1.2% [drying at 130° C.]
Water content: 4.6% [Karl-Fischer titration]
Conductivity: 4 S/cm Example 1 Preparation of an LiFePO$_4$/PEDOT/PSS composite as the electrode (according to the invention)

4.3 g of LiFePO$_4$ (MTI, USA; 2.5-5 μm particle size, theoretical capacitance of 125 mAh/g) were mixed with 29 g of the dispersion from Example 2 in an oxygen-free and anhydrous atmosphere. For this, the materials were stirred by means of a stirrer (ViskoPakt, H/Tec Zang GmbH) at 750 rpm. The homogenized paste was applied in a wet film thickness of 75 μm to a plasma-pretreated aluminium foil by means of doctor blades. The dried coating has a thickness of approx. 35 μm and comprises an LiFePO$_4$ to PEDOT/PSS weight ratio of approx. 92.5:7.5, called E1 in the following.

Comparative Example 1: Preparation of an LiFePO$_4$/Carbon Black/PVDF Composite (Comparative Example)

NMP was added to 17 g of LiFePO$_4$ (MIT; 2.5-5 μm particle size, theoretical capacitance of 125 mAh/g), 2 g of carbon black and 1 g of polyvinylidene difluoride (PVDF; Sigma-Aldrich) and the mixture was processed to a paste by means of a stirrer (ViskoPakt, H/Tec Zang GmbH) at 750 rpm. The paste was applied in a wet film thickness of 75 μm to a plasma-pretreated aluminium foil by means of doctor blades. The dried coating has a thickness of approx. 35 μm. The ratio of LiFePO$_4$:carbon black:PVDF is 85:10:5. The electrode is called E2 in the following.

Example 2: Battery Properties of E1 and E2

The electrochemical properties of electrodes E1 and E2 are chosen . . . a three-electrode arrangement with lithium metal as the counter-electrode and lithium metal as the reference electrode. A Swagelok design is used, such as is described, for example, in D. Guyomard and J-M. Tarascon, J. Electrochem. Soc., 139, 937 (1992). The geometric size of the electrodes here is 1 cm$^2$. The electrolyte solution has the composition as follows: ethylene carbonate (EC; ABCR) and ethylene-methylene carbonate (EMC; ABCR) are mixed 1:1 (w/w). A 1 molar solution of LiPF$_6$ (Sigma-Aldrich) in this mixture is then prepared.

The electrochemical properties of the two electrodes are shown in the figure. The redox activity in the voltage window from 3 to 4 V observed for both electrodes reflects the Li intercalation/deintercalation in LiFePO$_4$. Comparable charge quantities of approximately 120 mC±10 have been calculated for the redox processes. In the case of E1 both the anodic and the cathodic reaction start at lower overvoltages. The peak distance moreover decreases by approximately 100 mV from E1 compared with E2, which indicates a higher reversibility and improved kinetics of the reaction. Better kinetics are said to have a positive influence on both the efficiency and the current capability of a battery, which is demonstrated in the following results.

Example 3: Battery Properties of E1 and E2

The battery properties of E1 and E2 are determined in the same arrangement as the electrochemical properties. FIGS. 2 and 3 show the charge-discharge properties of the two electrodes at different C rates. The properties at low C rates are very similar. Only at very low and high SOC values is a higher overvoltage to be observed for the conventional LiFePO$_4$ electrode (FIG. 2). In this context the voltage efficiencies are comparable (94% for E1 and 93% for E2). Pronounced differences in battery properties can be observed between the two electrodes at higher C rates (FIG. 3). A low overall overvoltage and an increased voltage efficiency (90% for E1 and 86% for E2) are to be observed at 1 C in the case of the PEDOT-containing electrode. This indicates an increased current capability of the cathode E1 compared with the conventional LiFePO$_4$ electrode E2.

In FIG. 4, the loss in capacitance of the E1 cathode during cycling at various C rates is shown in comparison with that of the E2 electrode. In addition, the derivable capacitances have been standardized to the capacitance of the initial cycle (FIG. 5). It can be clearly seen that the PEDOT cell has a better current capability with respect to charging at higher C rates. For example, at 5 C for E1 approx. 38% of the original capacitance are derivable after 8 cycles, whereas for E2 only approx. 25% was observed. Furthermore, the cell proves to be more stable to ageing. After 60 cycles at 1 C a negligible loss in capacitance is to be recorded for E1. In contrast, the loss in capacitance of the cell E2 is more than 20%. At low C rates the derivable capacitances lie close to one another. At higher C rates significantly more capacitance is accessible for the cell E1.

The invention claimed is:

1. A composition comprising:
   a) complexes of polythiophene and polyanions,
   b) at least one lithium-containing compound, and
   c) at least one solvent,
   wherein the composition comprises less than 1 g of a material comprising elemental carbon, based on 1 g of the polythiophenes, or comprises no material at all comprising elemental carbon.

2. The composition according to claim 1, wherein the complexes a) are complexes of poly(3,4-ethylenedioxythiophene) and polystyrenesulphonic acid (PEDOT/PSS).

3. The composition according to claim 1, wherein the at least one lithium-containing compound is chosen from the group consisting of LiCoO$_2$, LiNiO$_2$, LiNi$_{1-x}$Co$_x$O$_2$, LiNi$_{0.85}$Co$_{0.1}$Al$_{0.05}$O$_2$, LiNi$_{0.33}$Mn$_{0.33}$O$_2$, LiMn$_2$O$_4$, LiFePO$_4$, Li$_3$V$_2$(PO$_4$)$_3$, LiMnPO$_4$, LiV$_3$O$_8$ or mixtures of at least two of these.

4. The composition according to claim 3, wherein the at least one lithium-containing compound is LiFePO$_4$.

5. The composition according to claim 1, wherein the at least one lithium-containing compound is present in the form of particles having a weight average particle size in a range of from 0.02 to 100 μm.

6. The composition according to claim 1, wherein the at least one solvent is an organic, protic solvent.

7. The composition according to claim 1, wherein the at least one solvent is chosen from the group consisting of water, alcohols, ketones, nitriles, sulphoxides, sulphones, carboxylic acid amides, pyrrolidones, carbonates and mixtures of at least two of these.

8. The composition according to claim 7, wherein the at least one solvent is N-methylpyrrolidone.

9. The composition according to claim 1, wherein the solids content of the composition is in a range of from 0.01 to 60 wt. %.

10. The composition according to claim 1, wherein the weight ratio of component b) to component a) in the composition is in a range of from 1:1 to 200:1.

11. The composition according to claim 1, wherein the composition comprises a water content, determined by Karl-Fischer titration, of at most 10 wt. %, based on the total weight of the composition.

12. A process for the preparation of a composition, comprising the process steps:
- I) provision of a composition comprising complexes of the polythiophene and the polyanion;
- II) mixing of the composition comprising complexes of the polythiophene and the polyanion with at least one lithium-containing compound;
- wherein in the process less than 1 g of a material comprising elemental carbon, based on 1 g of the polythiophenes, is employed in the preparation of the composition, or wherein no material at all comprising elemental carbon is employed.

13. The process according to claim 12, further comprising the process steps:
- Ia) oxidative polymerization of thiophene monomers in the presence of polyanions in an aqueous phase at an oxygen concentration of less than 3 mg/l, obtaining an aqueous composition comprising complexes of the polythiophene and the polyanion;
- Ib) at least partial removal, by means of an ion exchanger, of salts from the aqueous composition obtained in process step Ia);
- Ic) addition of at least one polar, organic solvent to the desalinated aqueous composition obtained in process step Ib);
- Id) at least partial removal of the water from the desalinated aqueous composition obtained in process step Ic), obtaining an organic composition comprising the complexes of polythiophene and polyanions and the at least one organic, polar solvent;
- II) mixing of the organic composition obtained in process step Id) comprising the complexes of polythiophene and polyanions and the organic, polar solvent with at least one lithium metal oxide.

14. The process according to claim 13, wherein the oxidative polymerization of the thiophene monomers in process step Ia) is carried out under a pressure of less than 500 mbar.

15. The process according to claim 13, wherein a dried layer of the composition obtained in process step Ib) to which 5 wt. % of DMSO has been added has a conductivity of at least 50 S/cm.

16. The process according to claim 15, wherein a dried layer of the aqueous composition obtained in process step Ib) to which 5 wt. % of DMSO has been added has a conductivity of at least 100 S/cm.

17. The process according to claim 13, wherein in process step Id) the water is removed to such an extent that subsequently to process step II) a composition having a water content, determined by Karl-Fischer titration, of at most 10 wt. %, based on the total weight of the composition, is obtained.

18. A composition obtainable by the process according to claim 12.

19. A cathode in a Li ion accumulator, obtainable by the application of a composition according to claim 1 to a substrate and the at least partial removal of the at least one organic solvent.

* * * * *